(12) United States Patent  
Lathrop et al.

(10) Patent No.: US 12,521,870 B2  
(45) Date of Patent: Jan. 13, 2026

(54) CONTRACTILE AND EXTENSILE FLUIDIC ARTIFICIAL MUSCLE ACTUATOR

(71) Applicant: KATHOLIEKE UNIVERSITEIT LEUVEN, Leuven (BE)

(72) Inventors: Robert Lathrop, Leuven (BE); Emmanuel Vander Poorten, Mechelen (BE); Mouloud Ourak, Leuven (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 0 days.

(21) Appl. No.: 18/696,104

(22) PCT Filed: Sep. 22, 2022

(86) PCT No.: PCT/EP2022/076372  
§ 371 (c)(1),  
(2) Date: Mar. 27, 2024

(87) PCT Pub. No.: WO2023/052233  
PCT Pub. Date: Apr. 6, 2023

(65) Prior Publication Data  
US 2025/0128405 A1    Apr. 24, 2025

(30) Foreign Application Priority Data

Sep. 30, 2021 (EP) .................................... 21200227  
Oct. 1, 2021 (EP) .................................... 21200542

(51) Int. Cl.  
*B25J 9/10* (2006.01)  
*B25J 9/00* (2006.01)  
(Continued)

(52) U.S. Cl.  
CPC ........... *B25J 9/1075* (2013.01); *B25J 9/0009* (2013.01); *B25J 9/142* (2013.01); *F15B 15/061* (2013.01); *F15B 15/103* (2013.01); *F15B 15/084* (2013.01)

(58) Field of Classification Search  
CPC ........ B25J 9/0009; B25J 9/1075; B25J 9/142; F15B 15/061; F15B 15/084; F15B 15/103  
See application file for complete search history.

(56) References Cited

U.S. PATENT DOCUMENTS

| 4,689,538 | A | 8/1987 | Sakaguchi et al. |
| 10,132,333 | B2 * | 11/2018 | Atkins ................. F15B 15/103 |
| 2016/0138621 | A1 | 5/2016 | Atkins et al. |

FOREIGN PATENT DOCUMENTS

| EP | 3313328 B1 * | 5/2020 | ............... A61F 2/50 |
| JP | 60241501 A * | 11/1985 | |

(Continued)

OTHER PUBLICATIONS

International Search Report and Written Opinion of the International Searching Authority from the European Patent Office, in PCT/EP2022/076372 dated Feb. 6, 2023, which is an international application to which this application claims priority.

(Continued)

*Primary Examiner* — William C Joyce  
(74) *Attorney, Agent, or Firm* — Kolitch Romano Dascenzo Gates LLC

(57) ABSTRACT

A fluidic artificial muscle actuator may include at least one inflatable bladder defining a first inflatable segment coupled to a first member and to a second member arranged at opposite ends of the first inflatable segment, and a second inflatable segment coupled to a third member and to a fourth member arranged at opposite ends of the second inflatable segment, and an effector coupled to the first inflatable segment and to the second inflatable segment for providing (Continued)

an actuator output. The first inflatable segment is configured to contract in a longitudinal direction with increase in fluid pressure in the first inflatable segment and the second inflatable segment is configured to extend in the longitudinal direction with increase in fluid pressure in the second inflatable segment.

15 Claims, 9 Drawing Sheets

(51) Int. Cl.
  *B25J 9/14* (2006.01)
  *F15B 15/06* (2006.01)
  *F15B 15/10* (2006.01)
  *F15B 15/08* (2006.01)

(56) References Cited

FOREIGN PATENT DOCUMENTS

| JP | 2000120328 A | * | 4/2000 | |
|---|---|---|---|---|
| WO | WO-2007069526 A1 | * | 6/2007 | ............ F15B 15/066 |
| WO | WO-2021065454 A1 | * | 4/2021 | ............ B25J 13/088 |

OTHER PUBLICATIONS

Daerden, Frank, et al., "Pneumatic Articial Muscles: actuators for robitcs and automation"; obtained from http://lucy.vub.ac.be/publications/daerden_lefeber_ejmee.pdf; Jan. 23, 2005.
Pillsbury, Thomas E., et al., "Comparison of Contractile and Extensile Pneumatic Articial Muscles"; IEEE International Conference on Advanced Intelligent Mechatronics (AIM) 2016.

* cited by examiner

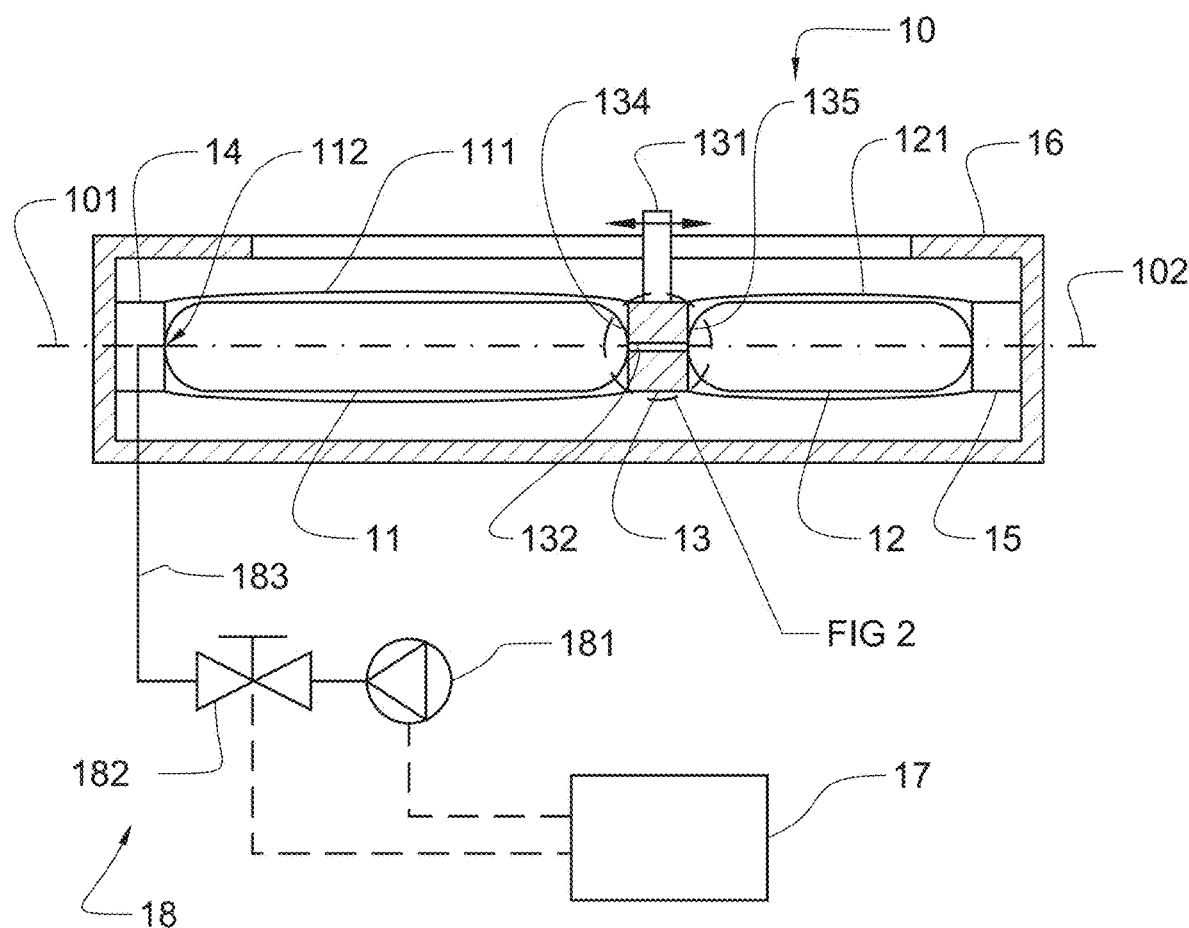
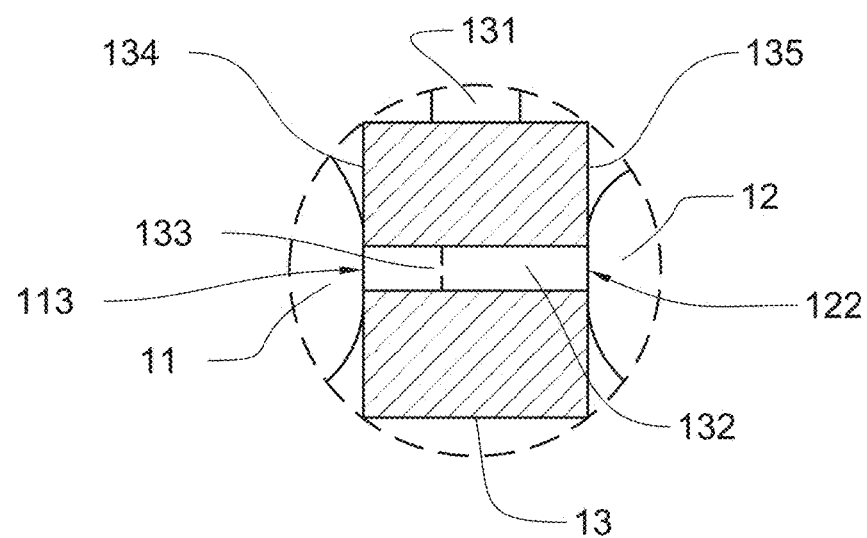

CONTRACTILE AND EXTENSILE FLUIDIC ARTIFICIAL MUSCLE ACTUATOR

TECHNICAL FIELD

The present disclosure is related to fluidic artificial muscles allowing bidirectional force transmission. In particular, the present disclosure is related to fluidic artificial muscles comprising a plurality of inflatable bladders.

BACKGROUND

Fluidic artificial muscles are utilized in aerospace, robotic and minimally invasive surgery applications for their relatively large stroke and high actuation force at low weight. Traditionally, fluidic artificial muscles have been designed with an inflatable bladder operably coupled to end fittings at opposite ends of the bladder. The bladder expands when inflated causing the muscle to radially expand and axially contract. Such fluidic artificial muscles are referred to as contractile. Different types of fluidic artificial muscles have been developed over time. These can be classified based on their operation (pneumatic or hydraulic, both types are referred to herein as fluidic), on the type of bladder used (stretching membrane or rearranging membrane) and on the presence or absence of a sleeve enveloping the bladder (braided sleeve, netted sleeve or reinforcement embedded in the bladder membrane). One common type of fluidic artificial muscle is referred to as Mckibben muscle and comprises a stretching membrane-type bladder enveloped with a braided sleeve. Both the bladder and the sleeve are connected to the end fittings. A comprehensive overview of contractile fluidic artificial muscles can be found in F. Daerden and D. Lefeber, Pneumatic artificial muscles: actuators for robotics and automation, European journal of mechanical and environmental engineering, vol. 47, No. 1, pp. 11-21, 2002.

These fluidic artificial muscles are contractile devices and consequently can generate motion in one direction only. To generate bidirectional motion, two actuators need to be coupled in a so-called antagonistic setup, where they are connected in opposition to a load.

US 2016/0138621, 19 May 2016 discloses an actuation system including a first pneumatic muscle connected in series to a second pneumatic muscle and a valve connected to the pneumatic muscles to control a pressure in the pneumatic muscles. The system also includes a positioning mechanism to control a movement of a component to be actuated by the actuation system and a controller connected to the pneumatic muscles, the valve, and the positioning mechanism, the controller to control actuation of the component by controlling the pressure in the pneumatic muscles. The first pneumatic muscle can be in a contracted state when the second pneumatic muscle is in an extended state, and the first pneumatic muscle can transition to an extended state when the second pneumatic muscle transitions to a contracted state. The controller can be configured to control the valve to control the pressure in the first pneumatic muscle and a pressure in the second pneumatic muscle. To actuate the component in a first direction, the controller performs operations including controlling the valve to apply an increasing pressure in the first pneumatic muscle and controlling the valve to apply a decreasing pressure in the second pneumatic muscle while applying the increasing pressure in the first pneumatic muscle. To actuate the component in a second direction opposite the first direction, the controller performs operations including controlling the valve to apply a decreasing pressure in the first pneumatic muscle and controlling the valve to apply a increasing pressure in the second pneumatic muscle while applying the decreasing pressure in the first pneumatic muscle. The first and the second pneumatic muscles are hence both contractile and arranged in an antagonistic setup. Even though such an antagonistic setup allows to actuate a motion in two opposite directions, the positioning control is still difficult to realize. Indeed, while pressure must be increased in one of the two pneumatic muscles, pressure must be decreased in the other pneumatic muscle to allow advancement and the equilibrium position of the driven component is determined by the ratio of the gauge pressures in both pneumatic muscles. Hence, a separate control of the gauge pressures in the two pneumatic muscles is required.

On the other hand, extensile fluidic artificial muscles are known from T. E. Pillsbury, Q. Guan, and N. M. Wereley, Comparison of contractile and extensile pneumatic artificial muscles, 2016 IEEE International Conference on Advanced Intelligent Mechatronics (AIM), 2016, pp. 94-99. An extensile fluidic artificial muscle can be formed based on Mckibben muscles, one common variety of fluidic artificial muscles. Mckibben muscles typically consist of a braided mesh of inextensible fibers enclosing an elastic bladder which is held in place by attachment points at both ends. The bladder expands when pressurized causing the muscle to either contract or extend, depending on the angle of the braid that is used in the muscle's construction. It was reported that, when measured parallel to the longitudinal axis of the Mckibben muscle, a muscle with braid angle below 54.44° will contract, while a muscle with a higher braid angle will extend when pressurized. Extensile fluidic artificial muscles produce a larger stroke compared to contractile fluidic artificial muscles, but much lower forces.

SUMMARY

There is a need in the art to provide bidirectional fluidic artificial muscle actuators allowing both a high stroke and a high applied force. There is a need to provide such actuators where the radial expansion of the muscle is limited. There is a need to provide bidirectional fluidic artificial muscle actuators allowing improved bidirectional positioning control. There is a need to provide bidirectional fluidic artificial muscle actuators having simpler construction and/or allowing a simpler motion control.

According to a first aspect of the present disclosure, there is therefore provided a fluidic artificial muscle actuator as set out in the appended claims. A fluidic artificial muscle actuator comprises at least one inflatable bladder defining a first inflatable segment and a second inflatable segment. The first inflatable segment is coupled to a first member and to a second member arranged at opposite ends of the first inflatable segment. The second inflatable segment is coupled to a third member and to a fourth member arranged at opposite ends of the second inflatable segment. An effector provides an output of the actuator, the effector being operably coupled to the first inflatable segment and to the second inflatable segment. The first member and the second member define a first longitudinal direction, which can be straight (linear) or curved. The third member and the fourth member define a second longitudinal direction, which can be straight (linear) or curved. In some examples, one inflatable bladder can extend continuously along the first and the second inflatable segments. In other examples, the first and the second inflatable segments are defined by a first and a second inflatable bladder, respectively. The first inflatable segment is configured to contract in the first longitudinal direction with increase in fluid pressure in the first inflatable segment and the second inflatable segment is configured to extend in the second longitudinal direction with increase in fluid pressure in the second inflatable segment.

The fluidic artificial muscle actuator as set forth in the present disclosure hence combines a contractile and an extensile artificial muscle, such that both apply force on the load in a same direction, resulting in a higher force to be transmitted and/or larger stroke compared to prior art fluidic artificial muscles. Furthermore, to operate fluidic artificial muscle actuators of the present disclosure, pressure is increased or decreased in both the first and second inflatable segments, which greatly simplifies the fluid supply system, resulting in lower cost and smaller footprint. Fluidic pneumatic actuators as set forth in the present disclosure advantageously enable miniaturization, which is key for utilizing these actuators in endoscopes with limited cross sectional area.

Advantageously, the first and the second inflatable segments are in fluid communication with one another. A fluid supply system is configured to inflate/pressurize the at least one inflatable bladder in one of the first and second inflatable segments, and fluid is supplied from the one of the first and the second inflatable segments to the other one for inflating/pressurizing. By so doing, a single fluid supply system can be utilized, further simplifying construction and reducing cost and dimensions, enabling further miniaturization.

According to a second aspect of the present disclosure, there is provided a device, such as a minimally invasive surgical device, e.g. a catheter or endoscope, or a robot, comprising the fluidic artificial muscle actuator as described herein. Multiple fluidic artificial muscle actuators of the present disclosure can be integrated to the device for actuating robotic motion.

BRIEF DESCRIPTION OF THE DRAWINGS

Aspects of the present disclosure will now be described in more detail with reference to the appended drawings, wherein same reference numerals illustrate same features and wherein:

FIG. 1 represents a diagram of an embodiment of a fluidic artificial muscle actuator according to the present disclosure configured for actuating linear motion;

FIG. 2 represents an enlarged detail of the effector and fluid communication port between the first bladder and the second bladder of the actuator of FIG. 1;

FIG. 4B represents the fluidic artificial muscle of FIG. 4A when the bladder is inflated and the braided sleeve forces the bladder to extend in axial direction;

DETAILED DESCRIPTION

Figure 3A:
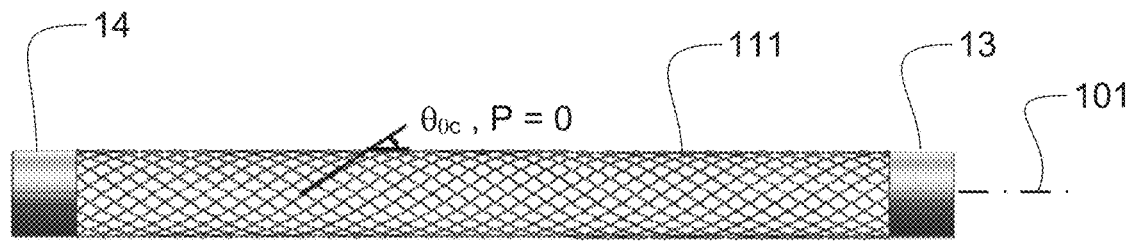
FIG. 3A represents a contractile Mckibben muscle with braided sleeve when the bladder is not inflated.

Referring to FIG. 1, an artificial muscle actuator 10 according to the present disclosure comprises a first inflatable bladder 11 and a second inflatable bladder 12. Either one, or both the first bladder 11 and the second bladder 12 can be formed of: a membrane which expands upon increasing pressure in the bladder, a membrane having faces that rearrange upon increasing pressure in the bladder, a combination of both, or any other inflatable bladder suitable for use in fluidic artificial muscles. First inflatable bladder 11 is attached or at least operably coupled to end fittings 14 and 134 arranged at opposite ends of the first bladder 11. First inflatable bladder can be, though does not need to be, of elongate shape with longitudinal axis 101 defined by the end fittings 14, 134. Second inflatable bladder 12 is attached or at least operably coupled to end fittings 135 and 15 arranged at opposite ends of the second bladder 12. Second inflatable bladder can be, though does not need to be, of elongate shape with longitudinal axis 102 defined by the end fittings 135 and 15. Longitudinal axes 101 and 102 can be parallel and possibly collinear, even though this is not strictly required. Longitudinal axes 101 and 102 can e.g. be curved. In the example of FIG. 1, the longitudinal axes 101 and 102 are collinear and the first and second inflatable bladders 11, 12 are arranged side by side at opposite ends of effector 13.

End fittings 14 and 15 are advantageously fixedly positioned relative to each other, e.g. they can be fixed to a support 16, such as a casing. The end fittings 134 and 135 are fixed to each other and both can be fixed to the effector 13 at opposite sides thereof. End fittings 134, 135 hence act as one integral member to move the effector 13. Effector 13 in this case is configured for linear motion along longitudinal axis 101/102. The effector 13 advantageously comprises coupling means 131 for transmitting force and/or motion to a load, which can be any structure that needs to be actuated.

The setup as in FIG. 1 resembles an antagonistic setup of two contractile fluidic artificial muscles. However, one important aspect of the present disclosure is that, while the first inflatable bladder 11 is configured for functioning as a contractile fluidic artificial muscle, the second inflatable bladder 12 is configured for functioning as an extensile fluidic artificial muscle. Therefore, while in a conventional antagonistic setup an increase in pressure in one bladder must correspond to a decrease in pressure in the other bladder in order to move the effector in either direction, in the present actuator 10, the effector can be actuated by either increasing or decreasing the pressure in both the first bladder 11 and the second bladder 12.

Compared to an antagonistic setup of two contractile fluidic artificial muscles, in which one muscle actuates the load while the other one acts as a brake to stop the load, the contractile and extensile muscles of the fluidic artificial muscle actuator of the present disclosure can both apply force on the load in a same direction, resulting in a higher force to be transmitted and/or larger stroke.

Any means allowing the first inflatable bladder 11 to be configured as contractile, i.e. the bladder 11 is configured to decrease the distance between fittings 14 and 13 upon increase in pressure in the bladder 11, can be provided. By way of example, the first bladder is enveloped in a braided sleeve 111 attached to the fittings 14 and 134. The braided sleeve 111 can allow a radial expansion of the first bladder 11 along with an axial contraction of the bladder 11 when the pressure in the bladder 11 is increased. This setup is known as a Mckibben contractile artificial muscle. It is however not required that the bladder 11 itself be directly attached to the fittings 14 and 134, since the braided sleeve 111 can provide for force engagement with fittings 14 and 134. Any other type of contractile fluidic artificial muscle can be used in the alternative. The first bladder 11 and the second bladder 12 are advantageously configured for functioning under pressure higher than atmospheric pressure.

Any means allowing the second inflatable bladder 12 to be configured as extensile, i.e. the bladder 12 is configured to increase the distance between fittings 13 and 15 upon increase in pressure in the bladder 12, can be provided. By way of example, the second bladder 12 is enveloped in a braided sleeve 121 attached to fittings 13 and 15. The braided sleeve 121 can allow a radial contraction of the second bladder 12 along with an axial extension of the bladder 12 when the pressure in the bladder 12 is increased. In other examples, the second bladder 12 is formed by a plurality of bellows attached to one another along the longitudinal axis 102 and fluidly communicating with one another. The bellows each have a middle segment and connecting segments at either side of the middle segment along the longitudinal axis. Connecting segments of consecutive bellows are attached to one another. The middle segment has larger cross-sectional area than the cross-sectional area of the connecting segments. When pressure inside the plurality of bellows is increased, the connecting segments radially expand, resulting in an axial extension of the second bladder.

Figure 3B:
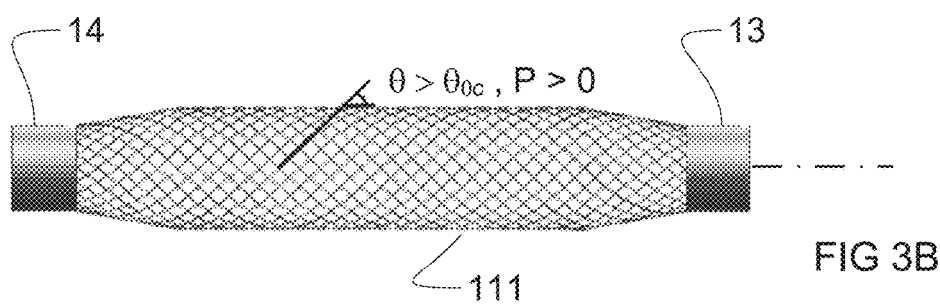
FIG. 3B represents the contractile Mckibben muscle of FIG. 3A when the bladder is inflated and the braided sleeve forces the bladder to contract in axial direction.

Referring to FIGS. 3A-B, for a braided sleeve 111 to be contractile, it was reported that the angle $\theta_{0c}$ of the threads of the braid, measured relative to the longitudinal axis 101, must be smaller than about 54°, particularly smaller than about 54.4°, in particular smaller than 54.44°, in a rest position (i.e. not inflated state of the bladder and no force applied to the braid), e.g. zero differential pressure P in the bladder with respect to atmospheric pressure (FIG. 3A). When the bladder is inflated and the differential pressure P inside the bladder increases, the braided sleeve 111 will extend radially and contract axially (FIG. 4B). In this case the threads of the braid rearrange to an angle $\theta$ larger than $\theta_{0c}$.

Figure 4A:
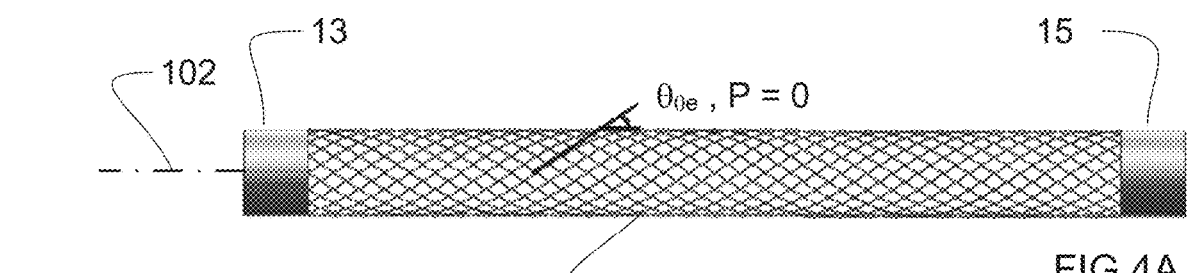
FIG. 4B represents an extensile fluidic artificial muscle with braided sleeve when the bladder is not inflated.
Figure 4B:
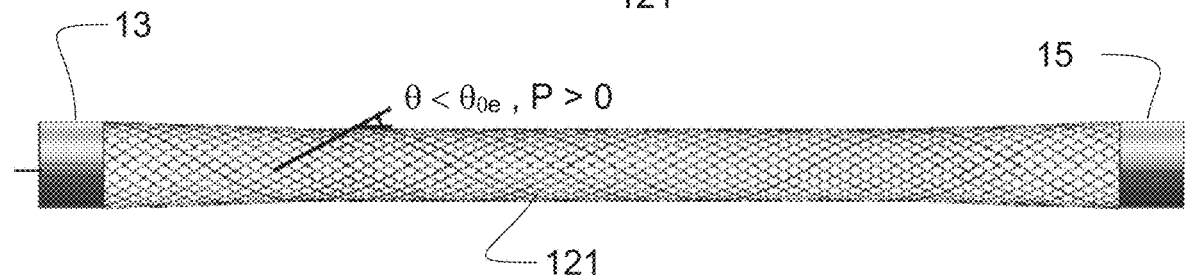

Referring to FIGS. 4A-B, for a braided sleeve 121 to be extensile, it was reported that the angle $\theta_{0e}$ of the threads of the braid, measured relative to the longitudinal axis 102, must be larger than about 55°, particularly larger than about 54.5°, in particular larger than 54.44°, in a rest position (i.e. not inflated state of the bladder and no force applied to the braid), e.g. zero differential pressure P in the bladder with respect to atmospheric pressure (FIG. 4A). When the bladder is inflated and the differential pressure P inside the bladder increases, the braided sleeve 121 will contract radially and extend axially (FIG. 4B). In this case the threads of the braid rearrange to an angle $\theta$ smaller than $\theta_{0e}$.

The braid angle $\theta_{0c}$ for contractile braid 111 and the braid angle $\theta_{0e}$ for extensile braid 121 can be selected independently of one another, allowing for greater freedom in designing a fluidic artificial muscle actuator having desired characteristics.

Alternative muscle configurations for the first and/or the second bladder can be, without limitation: a sleeved bladder muscle, a pleated pneumatic artificial muscle, a netted fluidic artificial muscle, a Yarlott artificial muscle, a ROMAC (Robotic Muscle Actuator), a Kukolj artificial muscle, a Morin artificial muscle, a Baldwin artificial muscle, a Paynter knitted artificial muscle, a Paynter hyperboloid artificial muscle, a bellows artificial muscle, an underpressure artificial muscle.

Referring again to FIG. 1, the actuator 10 can comprise a control unit 17 and a fluid supply system 18 for inflating the first bladder 11 and the second bladder 12. The fluid supply system 18 comprises a source of pressurized fluid, such as a fluid pump 181. Alternatively, a reservoir of pressurized fluid can be provided (not shown). The fluid supply system can comprise a valve 182 fluidly connected to the source of pressurized fluid (fluid pump 181). The valve 182 allows to control pressure in the first and/or the second bladder. The first bladder 11 comprises a first fluid port 112 and the second bladder comprises a second fluid port 122. Valve 182 is in fluid communication with the first fluid port 112 through a fluid supply duct 183. Alternatively, or in addition, fluid supply duct 183 can fluidly connect valve 182 to the second fluid supply port 122.

In the context of the present disclosure the term fluid can refer to a gas, such as air, $CO_2$, nitrogen, helium or any other suitable gas, or to a liquid, such as water, saline solutions, contrast agent or any other suitable liquid. Hence, in the context of the present disclosure, a fluidic artificial muscle actuator can refer to a pneumatic artificial muscle actuator or a hydraulic artificial muscle actuator.

The first and second bladders 11 and 12 can have substantially identical unpressurized diameters. Alternatively, the (unpressurized) diameter of the second, extensile bladder 12 can be larger than an (unpressurized) diameter of the first, contractile bladder 11. This avoids that the diameter of the second bladder 12 shrinks under pressurization to a too small value which can lead to stability problems. Additionally or alternatively the second bladder 12 can be made with a smaller wall thickness compared to the wall thickness of the first bladder 11, e.g. such that the unpressurized internal diameter of the second bladder is larger than the internal diameter of the first bladder. Alternatively, the first bladder 11 and the second bladder 12 can be made with a same wall thickness.

Advantageously, the actuator 10 comprises a single fluid supply system 18 configured to supply fluid to both the first bladder 11 and to the second bladder 12 through the first and the second fluid ports 112, 122 respectively. Advantageously, a fluid communication channel 132 is provided between the first bladder 11 and the second bladder 12. In the embodiment of FIG. 1, the fluid supply system 18 is configured to inflate the first bladder 11 through the first fluid supply port 112. The second bladder 12 is inflated by supplying fluid from the first bladder 11 through fluid communication channel 132 to the second fluid supply port 122. Advantageously, in a steady state, the first and the second bladders have equal pressure. Advantageously, both the first and the second bladders are configured for being utilized with positive gauge pressure.

Referring to FIG. 2 showing an enlarged detail of the effector 13, the first bladder 11 comprises a third fluid supply port 113. The fluid communication channel 132 extends from the third fluid supply port 113 to the second fluid supply port 122. Particularly, the second and the third fluid supply ports 122, 113 are provided at respective opposite ends of the effector 13 and the fluid communication channel 132 can comprise a bore through the effector 13, between the second and the third fluid supply ports 122, 113 respectively.

A single fluid supply system allows to simplify construction of the actuator and rendering it less bulky, since less tubing and cabling is required. Actuators according to the present disclosure therefore allow improved miniaturization compared to prior art fluidic artificial muscle actuators.

The fluid communication channel 132 can comprise an orifice 133 such as a diaphragm or nozzle providing a constriction of the fluid communication channel, which allows to control a pressure equalization between a pressure in the first bladder 11 and a pressure in the second bladder 12. This allows to obtain desired dynamics of the actuator 10.

It is alternatively possible to provide individual fluid supply systems (not shown) for separately inflating the first and the second bladders. It will be convenient to note that the fluid communication channel 132 and optionally the orifice 133 can be provided even when individual fluid supply systems are provided. This may allow obtaining a faster dynamics of the actuator.

A linear motion guide (not shown) can further be connected to the support 16 and a respective slide connected to the effector 13 so as to constrain translation of effector 13 and/or avoid problems of buckling of the artificial muscles.

Figure 6:
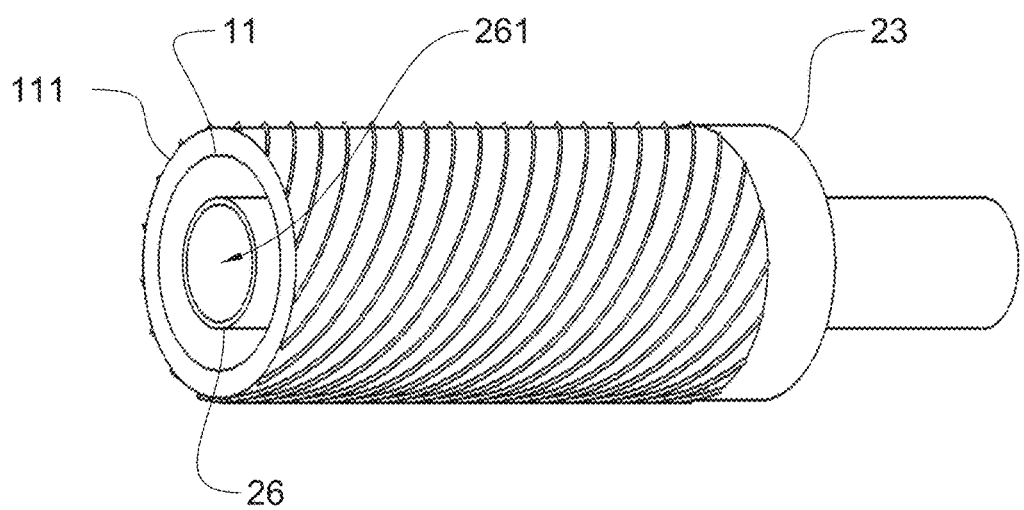
FIG. 6 represents a perspective view of a cross section of the first bladder of the fluidic artificial muscle actuator of FIG. 5.
Figure 7:
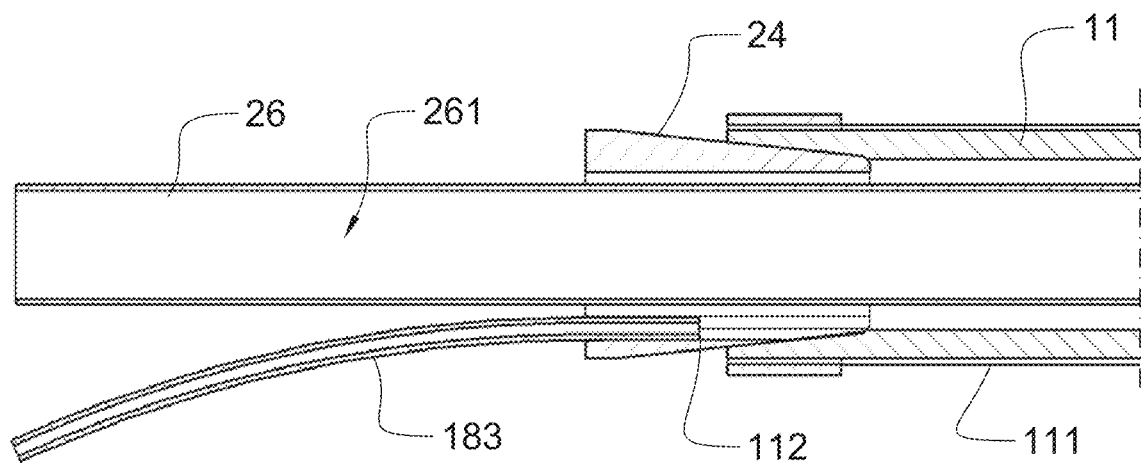
FIG. 7 represents an enlarged detail of an end fitting of the first bladder of the actuator of FIG. 5.
Figure 8:
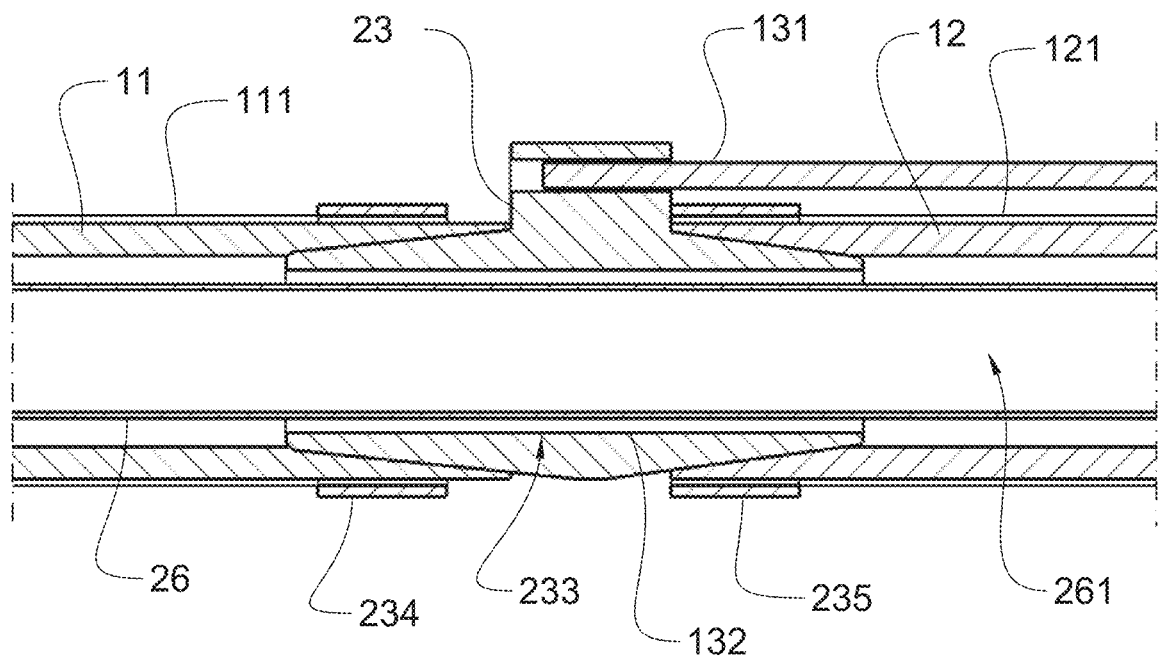
FIG. 8 represents an enlarged detail of the effector and fluid communication port between the first bladder and the second bladder of the actuator of FIG. 5.

Referring to FIGS. 5-8, fluidic artificial muscle actuator 20 differs from the artificial muscle actuator 10 in that it comprises a tubular member 26 acting as a support instead of, or in addition to, support (casing) 16 of artificial muscle actuator 10 as shown in FIG. 1. The contractile first bladder 11 is attached to end fitting 24 at one end and to effector 23 at the opposite end. The extensile second bladder 12 is attached to end fitting 25 at one end and to effector 23 at the opposite end. The effector 23 can comprise a fitting 234 for attachment of the first bladder 11 and/or the first braided sleeve 111 at one end, and a fitting 235 for attachment of the second bladder 12 and/or the second braided sleeve 121 at an opposite end (FIG. 8). The fittings 234 and 235 are fixed to each other and to the effector 23. The first and second bladders can be identical to the ones described in relation to FIG. 1.

End fittings 24 and 25 are arranged on the outer periphery of a tubular member 26 and are advantageously fixedly attached thereto. Effector 23 is slidable along tubular member 26. Effector 23 can e.g. comprise a through bore 233 and the tubular member 26 extends through the through bore 233. As a result, the tubular member 26 extends centrally through the first and second bladders 11, 12 (FIG. 6).

The through bore 233 can be made somewhat larger than the outer diameter of tubular member 26. By so doing, the fluid communication channel 132 between the first and second bladders can be easily provided. Alternatively, fluid communication channel 132 can be provided as a separate bore from through bore 233. Tubular member 26 can have a circular cross section. It can be advantageous to utilize (outer and/or inner) cross sections different from circular, e.g. polygonal, for tubular member 26, which may prevent rotation of the effector 23 about the longitudinal axis 101.

Figure 5:
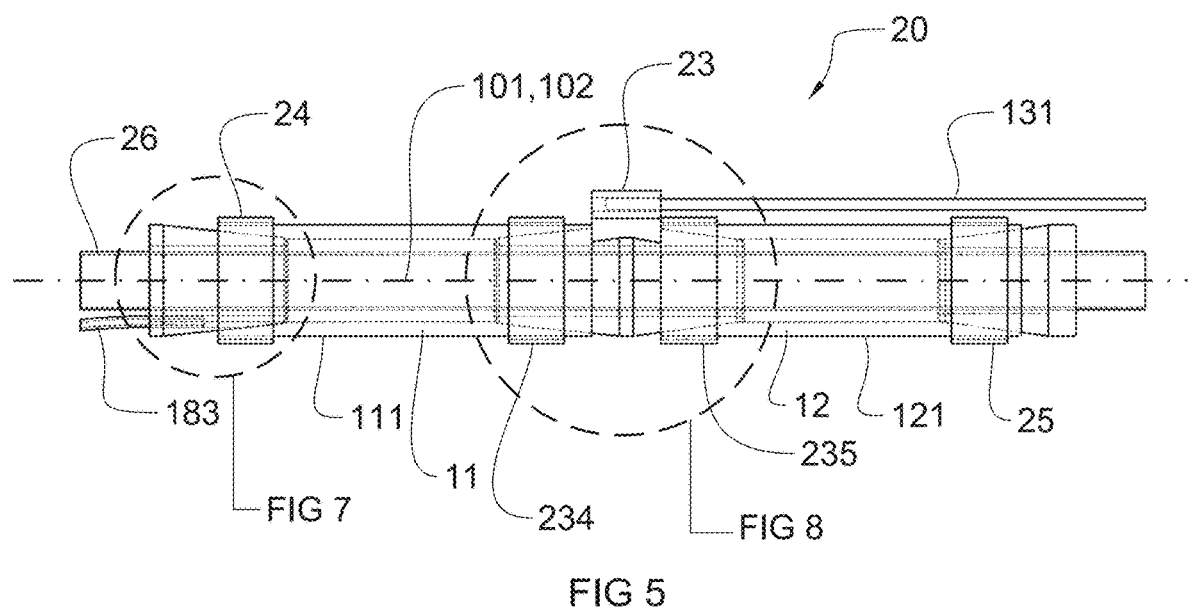
FIG. 5 represents a longitudinal sectional view of another embodiment of a fluidic artificial muscle actuator according to the present disclosure.

One advantage of the artificial muscle actuator 20 is that, since the end fittings 24 and 25 are fixedly mounted to tubular member 26, sealing of the first and second inflatable bladders 11, 12 is made easy. Even if the first and second bladders would be provided with individual fluid supply systems, a possible leakage of fluid between the bladders via the sliding surface of effector 23 over the tubular member can be tolerated. Furthermore, this setup is particularly suitable for being utilized with a single fluid supply system, e.g. with a single fluid supply duct 183 as shown in FIGS. 5 and 7, for supplying both first and second bladders with fluid.

It is alternatively possible to utilize the tubular member 26 for transmitting forces generated by the actuator 20. In this case, the effector 23 is rigidly fixed to tubular member 26, while the end fittings 24 and 25 are slidable with respect to the tubular member 26. By way of example, end fittings 24 and 25 can be fixed to a surrounding support structure 16 as shown in FIG. 1 for end fittings 14 and 15.

Figure 9A:
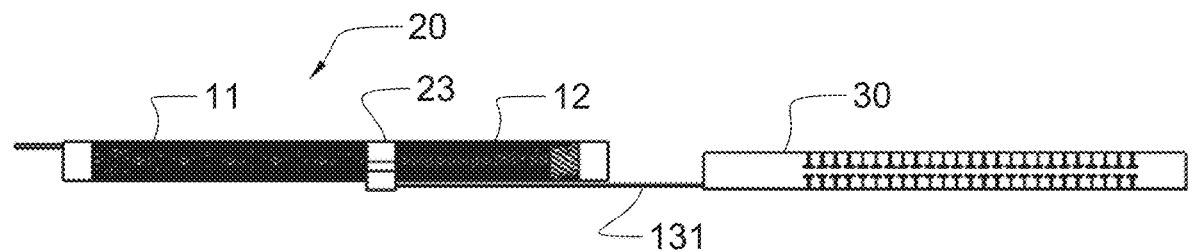
FIG. 9A represents the fluidic artificial muscle actuator of FIG. 5 operably coupled to a shaft of a (surgical) device in a rest position, as part of a deflection system.
Figure 9B:
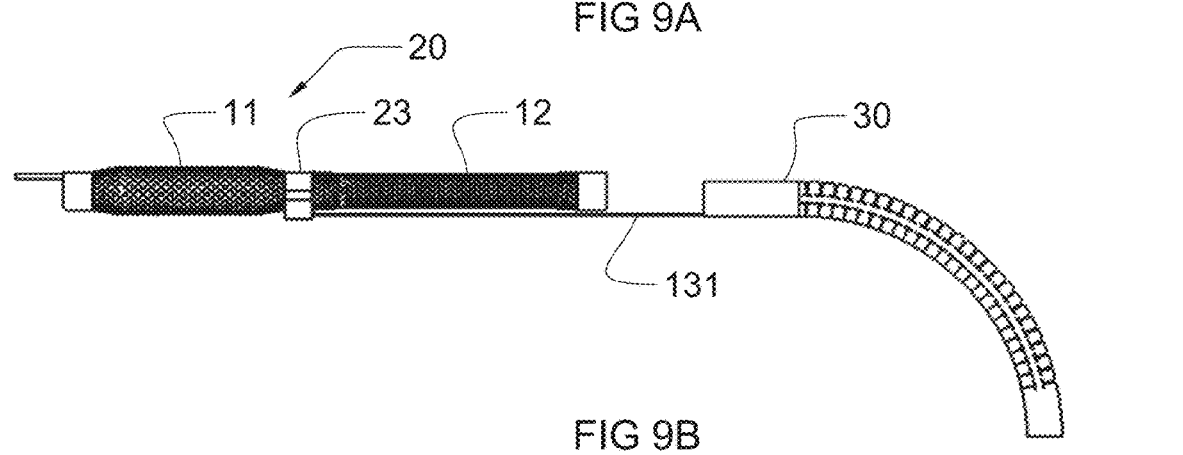
FIG. 9B represents the fluidic artificial muscle actuator of FIG. 5 operably coupled to the shaft in an actuated position, in which the shaft is deflected.

Tubular member 26 defines a lumen 261 which is fluidly isolated from the fluid chambers formed by the first bladder 11 and the second bladder 12. Lumen 261 can advantageously be used as a working channel, e.g. for passing instruments through the artificial muscle actuator 20, and hence allows further miniaturization. This is particularly useful for minimally invasive surgical devices. Referring to FIGS. 9A-B, the artificial muscle actuator can be used as an actuator for driving a deflection system of a shaft 30 of a device, which may be a catheter or endoscope. The shaft can comprise a lumen communicating with the lumen 261 of tubular member 26. By supplying fluid to the artificial muscle actuator 20, the effector 23 is moved, and the motion transmitted to the deflection system of shaft 30 via coupling means 131 to change the state of the shaft 30 from non-deflected (FIG. 9A) to deflected (FIG. 9B).

It can be beneficial to make the (unpressurized) diameter of the second, extensile bladder 12 larger than an (unpressurized) diameter of the first, contractile bladder 11. This prevents interaction between the second bladder and the tubular member as the second bladder shrinks radially during pressurization. Alternatively, or in addition, a same effect can be achieved by making the second bladder 12 with a smaller wall thickness compared to the wall thickness of the first bladder 11, e.g. such that the unpressurized internal diameter of the second bladder is larger than the internal diameter of the first bladder. Alternatively or in addition, the second, extensile bladder can be made from a lubricious material to reduce possible friction between the inner side of the second bladder and the tubular member. Still alternatively, a lubricant may be provided on the outer surface of the tubular member and/or the inner surface of the second bladder. than the contractile bladder.

Figure 9C:
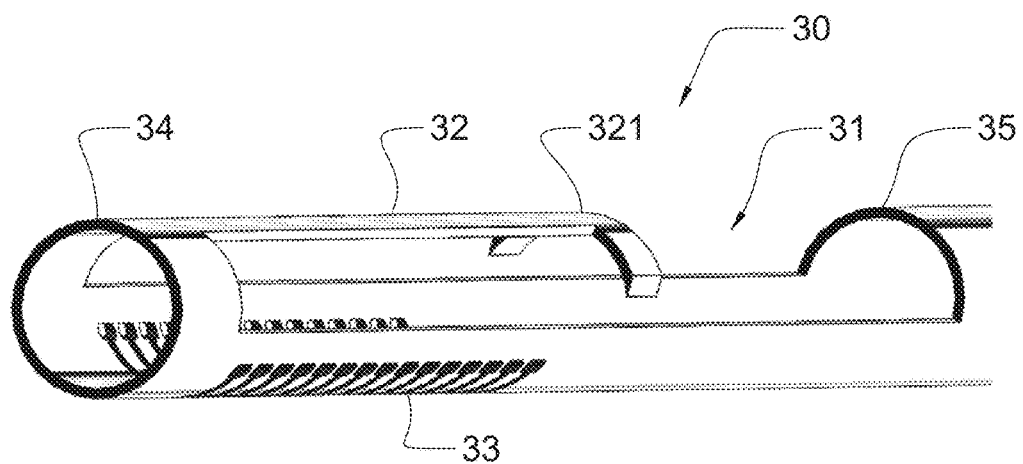
FIG. 9C represents a perspective view of an alternative embodiment of the shaft allowing to accommodate the fluidic artificial muscle actuator in the internal lumen of the shaft.

Alternatively, referring to FIG. 9C, the artificial muscle actuator can be embedded in a lumen 31 of the shaft 30, possibly in proximity of a bending segment 33 of the shaft 30. Bending segment 30 is made to have a flexible geometry and extends between a distal end 34 and a proximal end 35 which may be rigid. The shaft 30 comprises a bracket 32 operably coupled to bending segment 33. By way of example, bracket 32 comprises a base in force transmitting engagement with the distal end 34 (or alternatively with proximal end 35) and a free end 321, to which the effector of the artificial muscle actuator (not shown in FIG. 9C) can be attached. The artificial muscle actuator, such as actuator 10 (FIG. 1), is embedded in lumen 31 such that end fitting 14 is fixed to the distal end 34 and end fitting 15 is fixed to the proximal end 35 (or vice versa). Effector 13 is coupled to the free end 321 of the bracket 32. In this configuration, under pressurization, the first bladder 11 would contract and the second bladder 12 would expand, causing the effector 13 to move bracket 32 towards distal end 34 and to bend the segment 33 in accordance with its geometry.

The lumen 31 can be configured to allow radial expansion of the contractile bladder, such as by providing cut out sections in correspondence of the first bladder, the second bladder, or both. Such a configuration allows to leverage expandability of the artificial muscle actuator especially in surgical applications, i.e. the actuator when unpressurized could be small enough to fit into lumen 31 and/or through shaft introduction portals or anatomical chokepoints, then when navigated to the (surgical) target space and pressurized, the actuator can expand beyond the original footprint. This allows use of a larger diameter muscle actuator providing increased force while maintaining low cross-sectional area while the device is being brought to target anatomy.

In the above configuration, it is alternatively possible to accommodate the artificial muscle actuator 20 (FIGS. 5-8) into lumen 31. The tubular member 26 of artificial muscle actuator 20 can be flexible, allowing to accommodate the artificial muscle actuator 20 in the lumen 31 of the shaft 30 at a position corresponding to the bending segment 33, while providing a through-channel between the proximal end 35 and the distal end 34.

In some examples, the braided sleeves 111, 121 enveloping the first and/or second bladders can be coated in a protective covering made of silicone or other appropriate material. This can prevent damage of the braided sleeve during movement and/or prevent the braided sleeve from damaging or interacting with the environment (e.g. body tissues) in such case.

Multiple muscle actuators 10, 20 can be arranged in series in the shaft 30, in a same section or in different sections of the shaft, allowing to actuate motion of the (section of the) shaft along multiple degrees of freedom, e.g. bending about two orthogonal axes of rotation.

Figure 10:
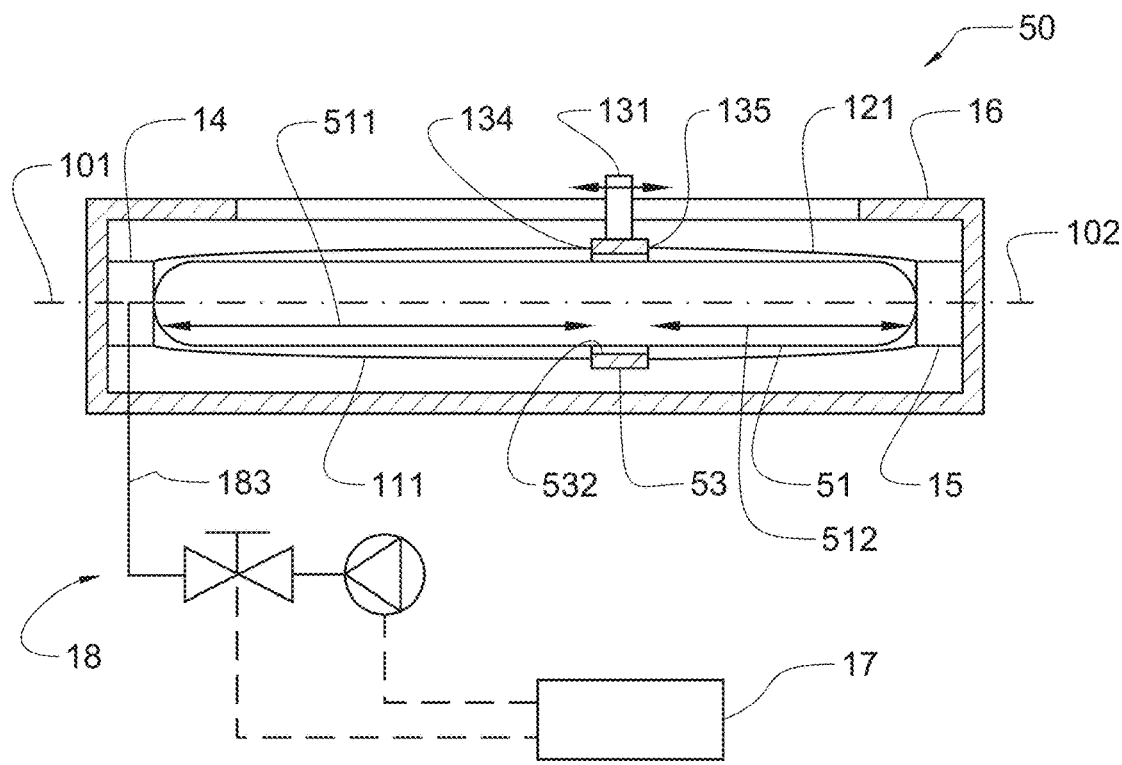
FIG. 10 represents a diagram of another embodiment of a fluidic artificial muscle actuator according to the present disclosure configured for actuating linear motion.

Referring to FIG. 10, another example of an artificial fluidic muscle actuator 50 according to the present disclosure comprises a single inflatable bladder 51, instead of two bladders 11, 12 as described previously. A first longitudinal portion 511 of bladder 51 is enveloped by a contractile braided sleeve 111 and a second longitudinal portion 512 of bladder 51 is enveloped by an extensile braided sleeve 121. The first and second longitudinal portions 511 and 512 are juxtaposed and can span the entire length of bladder 51. The contractile braided sleeve 111 is attached to end fittings 14 and 134, and extensile braided sleeve is attached to end fittings 15 and 135, with the end fittings 134 and 135 fixed to each other and to the effector 53.

Effector 53 can comprise a through bore 532 with bladder 51 continuously extending through the through bore 532. Possibly ring-like end fittings 134 and 135 are fixed at opposite ends of the effector 53. In such a configuration, under pressurization, the contractile and extensile braided sleeves 111, 121 respectively will impart differing deformation to the bladder 51 along the first and second longitudinal segments 511, 512 respectively. Contractile braided sleeve 111 forces bladder 51 to expand radially while contracting longitudinally in segment 511. Extensile braided sleeve forces bladder 51 to extend longitudinally while contracting radially in segment 512. By so doing, a same motion and/or force can be actuated to the coupling means 131.

It may be advantageous for the effector 53 to constrain a radial size of the bladder 51. By way of example, the diameter of through bore 532 can be smaller than the natural (unpressurized) outer diameter of bladder 51. This can be useful to prevent effector 53 from moving with respect to bladder 51 during actuation. Alternatively, the effector 53 can be fixedly attached to bladder 51. By way of example, bladder 51 can be made with a pre-molded part designed to correspond to effector 53, further coupling the two elements.

It will be convenient to note that the above actuator configurations with two bladders/bladder segments, i.e. one contractile and another extensile, can be extended with additional inflatable bladders or bladder segments arranged in series. This allows for achieving higher force outputs of the actuator while reducing or at least limiting the (expanded) dimensions of the bladders.

Figure 11:
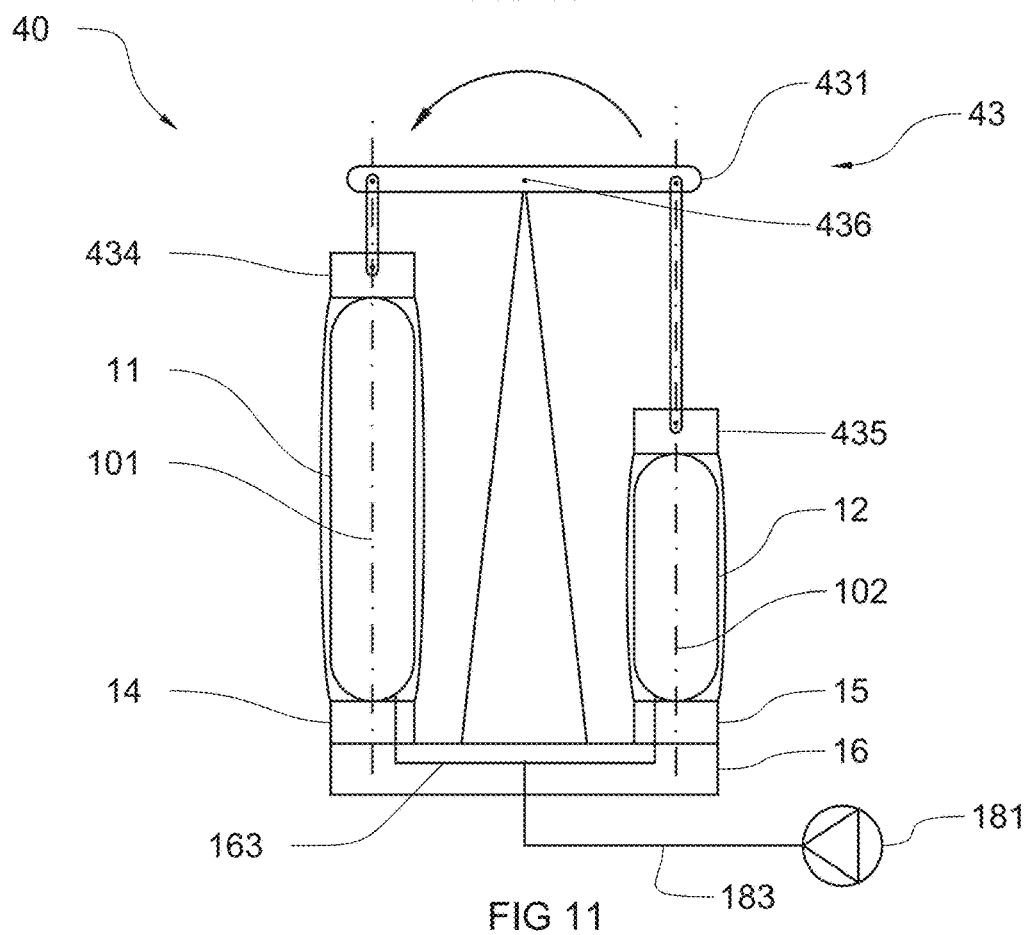
FIG. 11 represents a diagram of another embodiment of a fluidic artificial muscle actuator according to the present disclosure configured for actuating rotational motion.

Fluidic artificial muscle actuators according to the present disclosure can alternatively be utilized to actuate rotational motion, instead of linear motion. Referring to FIG. 11, the first bladder 11 and the second bladder 12 are arranged with parallel but offset longitudinal axes 101, 102 respectively. The effector 43 comprises a fitting 434 attached or operably coupled to the first bladder 11 and a fitting 435 attached or operably coupled to the second bladder 12. Fittings 434 and 435 are operably coupled to a lever arm 431 configured to pivot about a pivot axis 436 that can be perpendicular to a plane defined by the longitudinal axes 101 and 102. Supplying the first and the second bladder with pressurized fluid causes the lever arm to pivot about axis 436 in direction of the arrow indicated in the figure.

In this configuration, it is possible to provide a fluid communication channel 163 fluidly connecting the first and the second bladder 11, 12. Fluid communication channel can further be fluidly connected to fluid supply duct 183 and a (single) source of pressurized fluid 181 configured to supply both bladders with fluid under pressure.

It will be convenient to note that other configurations of the first and second bladder are possible, e.g. where the longitudinal axes 101 and 102 are not parallel.

EXPERIMENTS

A setup was built according to the diagram of FIG. 1. This configuration enables rapid testing of the approximate force and displacement generated by the proposed actuator while simplifying construction. The end fittings and effector were 3D printed on a Prusa SL1 machine (Prague, Czechia) using an ABS resin. The bladder material used in both first and second bladder is a 4 mm OD 0.5 mm wall thickness silicone tubing (Dow Corning, Michigan, USA). The bladders were both provided with a polyimide braided sleeve with 34.5° braid angle (Bossert Kast, Germany). The contractile bladder chamber is 70 mm in length while the length of the extensile bladder chamber is 30 mm. An additional 20 mm length of braid was compressed onto the extensile bladder chamber tubing during construction to approximate a braid angle of 71.8°. Components were bonded together and pneumatically sealed using Loctite 3430 2-part epoxy (Henkel, Germany). The assembled muscle is 4 mm in diameter at the expandable portion and 5 mm in diameter at the attachment to the fittings, with an overall length of 115 mm.

The artificial muscle was clamped in place in a custom jig to evaluate force generation and stroke length. Force was measured via a 10 kg load cell (Tedea-Huntleigh model 1022) attached to the effector, while displacement of the effector was measured by a laser sensor (model OADM 1216460/S35A, Baumer, Switzerland). Air pressure supplied to the bladders was controlled by a proportional pressure regulator (model VEAA, Festo, Germany) and measured via a pressure transducer (PA-21Y, Keller, Germany). A National Instruments (Texas, USA) cDAQ-9174 system with modules NI9205 (Analog voltage input), NI9237 (Analog bridge input), NI9263 (Analog voltage output), and NI9203 (Analog current input) was used along with LabVIEW software (National Instruments, Texas, USA) to record sensor measurements and produce a variable output signal to control the proportional pressure regulator.

Experiments were performed in order to characterize the actuator's response to a range of pneumatic inputs similar to those required for use in a robotically controlled surgical device. In order to measure force generated by the muscle the travelling attachment point was rigidly connected to the load cell. The results of this test are visible in FIG. 12B, showing the actuator hysteresis in response to a 0.5 Hz sinusoidal pressure input and FIG. 13C, showing the time-domain response of the system to a 0.5 Hz sinusoidal pressure input. This configuration was also used to characterize the response bandwidth of the actuator to a sinusoidal pressure inputs at a range of frequencies, as shown in FIG. 11.

In order to measure the stroke of the actuator the load cell was disconnected, allowing the effector to move freely. These results are shown in FIG. 13A, showing the actuator hysteresis in response to a 0.5 Hz sinusoidal pressure input and FIG. 13D, showing the actuator's response to various step changes in pressure level. Tests were performed over a pressure range of 0 to 6 bar, covering typical operating ranges of Mckibben muscles and the full range of the proportional pressure regulator used in the experimental setup. Force and pressure tests reported in FIG. 12 and FIGS. 12A-D were each repeated over three cycles.

The results shown demonstrate the operability of a prototype fluidic muscle actuation system according to the present disclosure. This configuration produced a maximum force of 13.1 N and displacement stroke of 13.3 mm. As seen in FIG. 13D, the actuator is capable of moving 13.3 mm in 0.54 seconds, which is a speed of 24.6 mm/sec. These values are higher than or within the range of typical actuator requirements for robotic surgical devices (1-10 Newtons force, 10-100 mm/sec speed, and 1-10 mm displacement).

Figure 12:
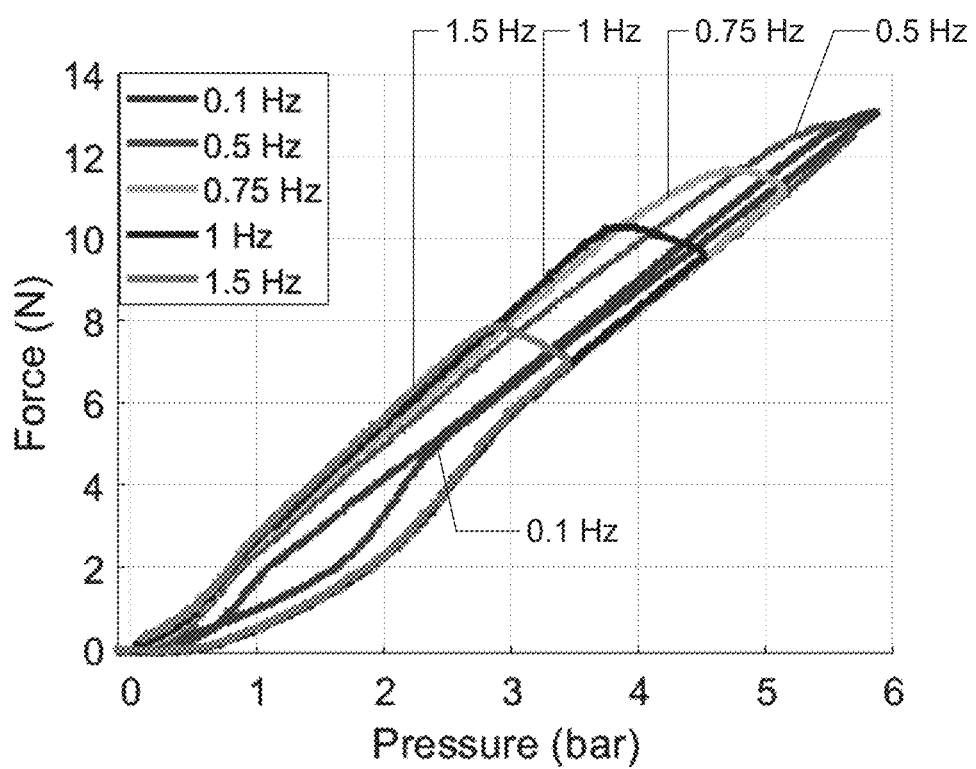
FIG. 12 represents a graph showing measured force output of a prototype fluidic artificial muscle actuator according to the present disclosure driven by a sinusoidal input pressure at variable frequencies.
Figure 13A:
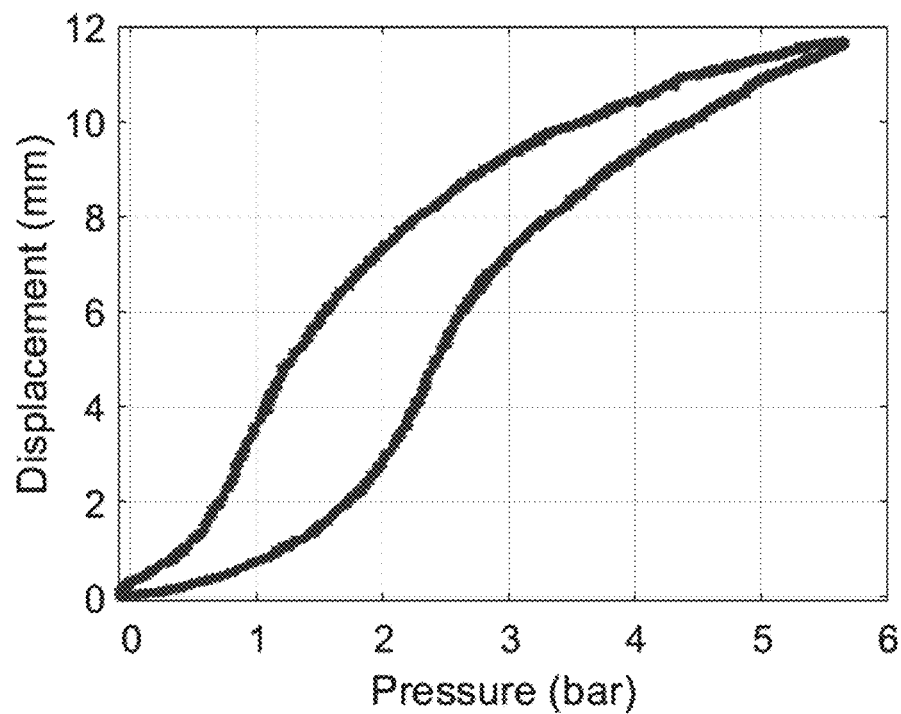
FIG. 13A represents a graph showing the stroke of the prototype fluidic artificial muscle actuator generated over 3 cycles when allowed to travel freely with 0.5 Hz sinusoid pressure input.
Figure 13B:
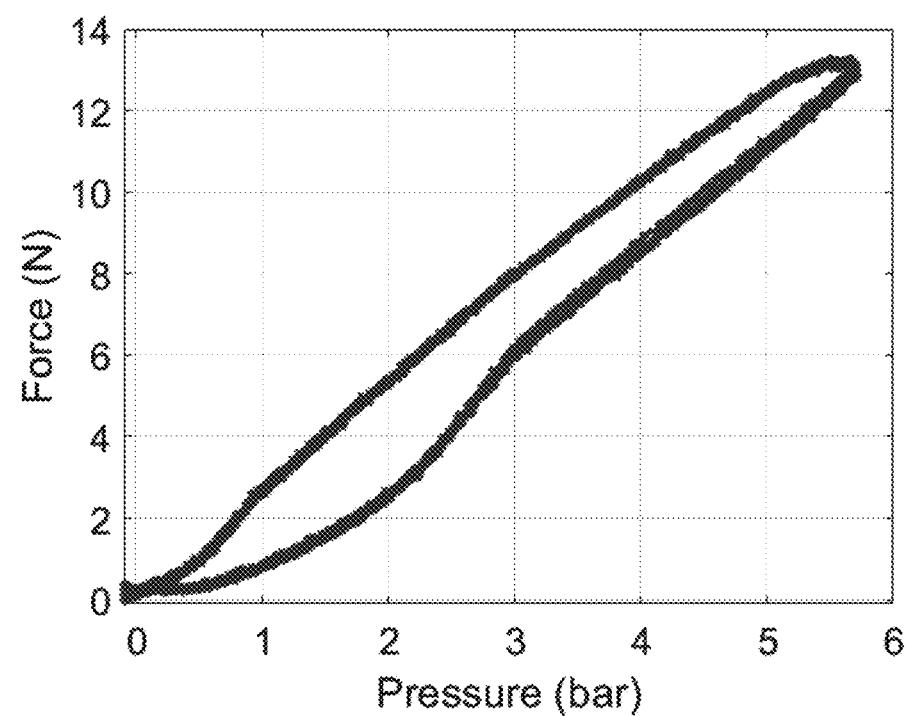
FIG. 13B represents a graph showing the blocked force of the prototype fluidic artificial muscle actuator generated over 3 cycles with 0.5 Hz sinusoid pressure input.
Figure 13C:
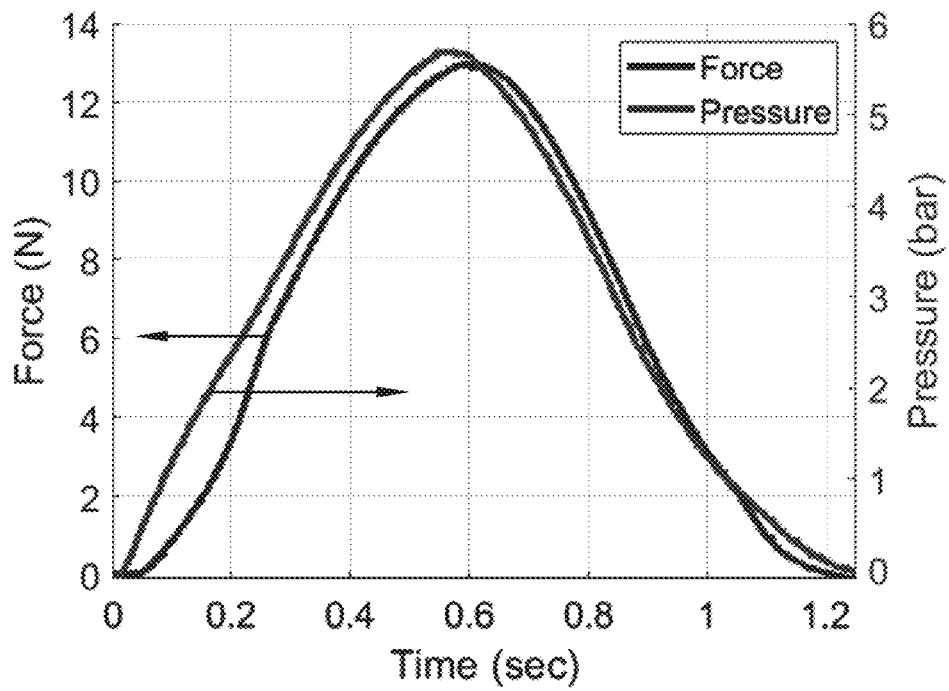
FIG. 13C represents a graph showing the force output of the prototype fluidic artificial muscle actuator with 0.5 Hz sinusoid pressure input.
Figure 13D:
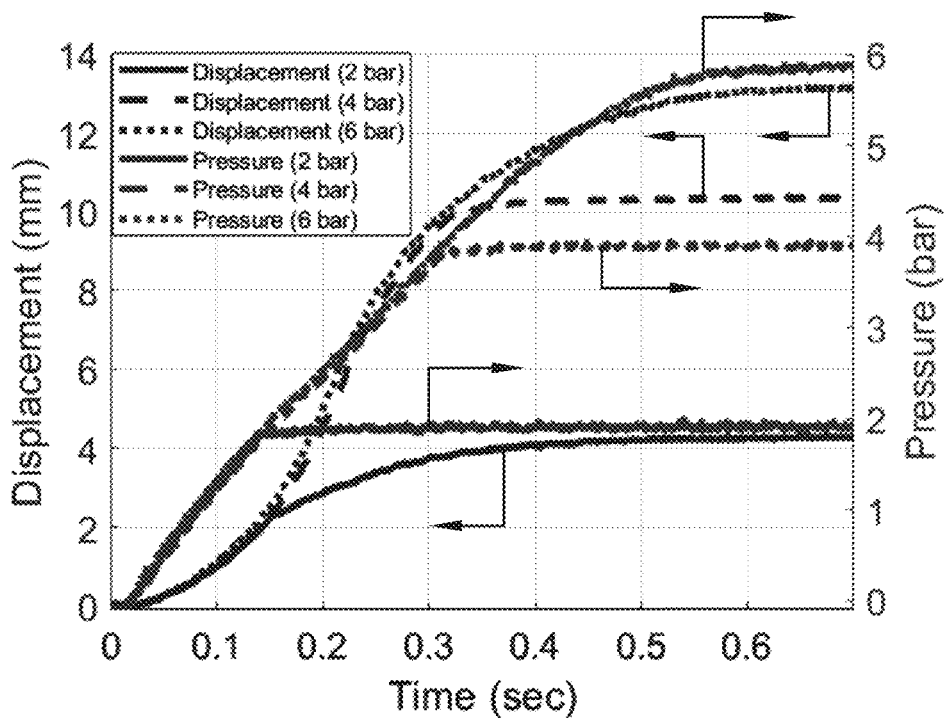
FIG. 13D represents a graph showing the response of the stroke of the prototype fluidic artificial muscle actuator over time, driven at different pressure levels.

As shown in FIG. 12, force produced declines and a greater hysteresis effect is present when the actuator is driven at faster frequencies. Force output of the system falls from a maximum of 13.1 N when driven by a sinusoidal pressure input with frequency 0.1 Hz or lower to 97.5% of the maximum at 0.5 Hz, 89.1% at 0.75 Hz, 78.4% at 1 Hz, and 60.1% of the maximum force at 1.5 Hz. This response is limited in part by the response speed of the proportional pressure regulator, which does not reach the full 6 bar amplitude of the sinusoidal pressure wave at higher frequencies. The actuator bandwidth can be improved by using small diameter high angle braided sleeves to construct the extensile segment, which will decrease the pressure deadband and enable faster response to changes in pressure level.

Various features and aspects of the present disclosure are set out in the following alphanumerically designated clauses.

A1. Fluidic artificial muscle actuator, comprising:
at least one inflatable bladder defining a first inflatable segment and a second inflatable segment,
the first inflatable segment coupled to a first member and to a second member arranged at opposite ends of the first inflatable segment, the first member and the second member defining a first longitudinal direction,
the second inflatable segment coupled to a third member and to a fourth member arranged at opposite ends of the second inflatable segment, the third member and the fourth member defining a second longitudinal direction, and
an effector operably coupled to the first inflatable segment and to the second inflatable segment for providing an actuator output,
wherein the first inflatable segment is configured to contract in the first longitudinal direction with increase in fluid pressure in the first inflatable segment,
wherein the second inflatable segment is configured to extend in the second longitudinal direction with increase in fluid pressure in the second inflatable segment.

A2. Fluidic artificial muscle actuator of clause A1, wherein the first inflatable segment comprises a first inflatable bladder and the second inflatable segment comprises a second inflatable bladder being a distinct or discontinuous inflatable bladder from the first inflatable bladder.

A3. Fluidic artificial muscle actuator of clause A1, wherein the first inflatable segment and the second inflatable segment are segments of a single inflatable bladder which is preferably continuous throughout the first and the second inflatable segments.

A4. Fluidic artificial muscle actuator of any one of the preceding clauses, further comprising a fluid supply system configured to increase fluid pressure in the second inflatable segment while increasing fluid pressure in the first inflatable segment.

A5. Fluidic artificial muscle actuator of any one of the preceding clauses, comprising a fluid communication port, wherein the first inflatable segment and the second inflatable segment are in fluid communication through the fluid communication port.

A6. Fluidic artificial muscle actuator of clause A5, wherein the fluid communication port comprises a constriction.

A7. Fluidic artificial muscle actuator of clause A5 or A6, comprising a first fluid supply port egressing in one of the first inflatable segment and the second inflatable segment, wherein the other one of the first inflatable segment and the second inflatable segment is configured to be inflated through the fluid communication port.

A8. Fluidic artificial muscle actuator of any one of the preceding clauses, wherein the second member and the third member are operably coupled to the effector to jointly provide the actuator output.

A9. Fluidic artificial muscle actuator of any one of the preceding clauses, wherein the second member and the third member are fixedly attached to the effector, preferably at opposite ends of the effector.

A10. Fluidic artificial muscle actuator of any one of the preceding clauses, wherein the first member and the fourth member are arranged at fixed positions relative to each other, preferably fixed positions relative to a support.

A11. Fluidic artificial muscle actuator of any one of the preceding clauses, wherein the effector is movable relative to the first member and/or the fourth member.

A12. Fluidic artificial muscle actuator of any one of the clauses A1 to A8, wherein the effector is movable relative to the second member and/or the third member, preferably the effector being operably coupled to the first member and/or the fourth member.

A13. Fluidic artificial muscle actuator of any one of the preceding clauses, wherein at least one of the first inflatable segment and the second inflatable segment comprises a braided sleeve enveloping the at least one inflatable bladder, particularly along the entire respective inflatable segment.

A14. Fluidic artificial muscle actuator of clause A13, wherein the braided sleeve is attached to the respective one of the first and second member and the third and fourth member.

A15. Fluidic artificial muscle actuator of clause A13 or A14, wherein the braided sleeve envelopes the at least one inflatable bladder in the second inflatable segment, the braided sleeve in the second inflatable segment comprising a braid having a braid angle of at least 54.44° (decimal values) relative to the second longitudinal direction.

A16. Fluidic artificial muscle actuator of any one of clauses A13 to A15, wherein the braided sleeve envelopes the at least one inflatable bladder in the first inflatable segment, the braided sleeve in the first inflatable segment comprising a braid having a braid angle less than 54.44° (decimal values) relative to the first longitudinal direction.

A17. Fluidic artificial muscle actuator of any one of the preceding clauses, further comprising a tubular member traversing the first inflatable segment along the first longitudinal direction and/or the second inflatable segment along the second longitudinal direction.

A18. Fluidic artificial muscle actuator of any one of the preceding clauses, further comprising a tubular member traversing the first inflatable segment from the first member to the second member and/or the second inflatable segment from the third member to the fourth member.

A19. Fluidic artificial muscle actuator of clause A17 or A18, wherein the tubular member comprises a lumen fluidically isolated from the respective first and/or second inflatable segment.

A20. Fluidic artificial muscle actuator of any one of clauses A17 to A19, wherein the tubular member traverses the first and the second inflatable segments, wherein the first member and the fourth member are fixed to the tubular member.

A21. Fluidic artificial muscle actuator of any one of clauses A17 to A19, wherein the tubular member traverses the first and the second inflatable segments, and the second member and the third member are fixed to the tubular member.

A22. Fluidic artificial muscle actuator of any one of clauses A17 to A21, wherein the effector is movable with respect to the tubular member.

A23. Fluidic artificial muscle actuator of any one of clauses A17 to A21, wherein the effector is in fixed position relative to the tubular member.

A24. Fluidic artificial muscle actuator of any one of the clauses A17 to A23, wherein the first and the second longitudinal directions are collinear and the tubular member traverses both the first inflatable segment and the second inflatable segment.

A25. Fluidic artificial muscle actuator of any one of the clauses A17 to A24, wherein the tubular member is flexible.

A26. Fluidic artificial muscle actuator of any one of the preceding clauses, wherein the effector is configured to provide a linear motion output.

A27. Fluidic artificial muscle actuator of any one of the preceding clauses, wherein the fluidic artificial muscle actuator is a pneumatic actuator or a hydraulic actuator.

A28. Device for endoscopic surgery, comprising the fluidic artificial muscle actuator of any one of the preceding clauses.

The invention claimed is:

1. A fluidic artificial muscle actuator (10, 20, 40), comprising:
   at least one inflatable bladder defining a first inflatable segment (11, 511) and a second inflatable segment (12, 512);
   the first inflatable segment (11, 511) coupled to a first member (14, 24) and to a second member (134, 234, 434) arranged at opposite ends of the first inflatable segment, the first member and the second member defining a first longitudinal direction (101);
   the second inflatable segment (12, 512) coupled to a third member (135, 235, 435) and to a fourth member (15, 25) arranged at opposite ends of the second inflatable segment, the third member and the fourth member defining a second longitudinal direction (102); and
   an effector (13, 23, 43, 53) operably coupled to the first inflatable segment and to the second inflatable segment and configured to provide an actuator output;
   wherein the first inflatable segment (11, 511) is configured to contract in the first longitudinal direction in response to an increase in fluid pressure in the first inflatable segment; and
   wherein the second inflatable segment (12) is configured to extend in the second longitudinal direction in response to an increase in fluid pressure in the second inflatable segment;
   further comprising a fluid communication port (113, 122, 132), wherein the first inflatable segment (11) and the second inflatable segment (12) are in fluid communication through the fluid communication port.

2. The fluidic artificial muscle actuator of claim 1, further comprising a fluid supply system (18) configured to increase fluid pressure in the second inflatable segment (12, 512) while increasing fluid pressure in the first inflatable segment (11, 511).

3. The fluidic artificial muscle actuator of claim 1, wherein the first inflatable segment comprises a first inflatable bladder (11) and the second inflatable segment comprises a second inflatable bladder (12) distinct from the first inflatable bladder.

4. The fluidic artificial muscle actuator of claim 1, wherein the fluid communication port comprises a constriction (133).

5. The fluidic artificial muscle actuator of claim 1, comprising a first fluid supply port (112) egressing in one of the first inflatable segment (11) and the second inflatable segment (12), wherein the other one of the first inflatable segment and the second inflatable segment is configured to be inflated through the fluid communication port (113, 122, 132).

6. The fluidic artificial muscle actuator of claim 1, wherein the second member (134, 234) and the third member (135, 235) are fixedly attached to the effector (13, 23, 53).

7. The fluidic artificial muscle actuator of claim 6, wherein the second member (134, 234) and the third member (135, 235) are fixedly attached at opposite ends of the effector (13, 23, 53).

8. The fluidic artificial muscle actuator of claim 1, wherein the first member (14) and the fourth member (15) are arranged at fixed positions relative to each other.

9. The fluidic artificial muscle actuator of claim 1, wherein at least one of the first inflatable segment (11, 511) and the second inflatable segment (12, 512) comprises a braided sleeve (111, 121) enveloping the at least one inflatable bladder along the respective inflatable segment.

10. The fluidic artificial muscle actuator of claim 9, wherein the braided sleeve (121) envelopes the at least one inflatable bladder along the second inflatable segment (12, 512), the braided sleeve comprising a braid having a braid angle of at least 54.44° relative to the second longitudinal direction (102).

11. The fluidic artificial muscle actuator of claim 1, further comprising a tubular member (26) traversing the first inflatable segment (11, 511) along the first longitudinal direction (101) and/or the second inflatable segment (12, 512) along the second longitudinal direction (102).

12. The fluidic artificial muscle actuator of claim 11, wherein the tubular member (26) comprises a lumen (261) fluidically isolated from the respective first and/or second inflatable segment.

13. The fluidic artificial muscle actuator of claim 11, wherein the first and the second longitudinal directions (101, 102) are collinear and the tubular member traverses both the first inflatable segment (11) and the second inflatable segment (12).

14. The fluidic artificial muscle actuator of claim 1, wherein the fluidic artificial muscle actuator is a pneumatic actuator.

15. A device for endoscopic surgery, the device comprising the fluidic artificial muscle actuator of claim 1.

* * * * *